United States Patent
Yasuda et al.

(10) Patent No.: US 8,963,387 B2
(45) Date of Patent: Feb. 24, 2015

(54) MOTOR ROTOR INCLUDING A RESOLVER ROTOR FOR DETECTING ROTATION POSITION

(75) Inventors: Hideaki Yasuda, Chita-gun (JP); Yasuyuki Satake, Nagoya (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 268 days.

(21) Appl. No.: 13/518,297

(22) PCT Filed: Jun. 28, 2010

(86) PCT No.: PCT/JP2010/060980
§ 371 (c)(1),
(2), (4) Date: Jun. 21, 2012

(87) PCT Pub. No.: WO2011/077774
PCT Pub. Date: Jun. 30, 2011

(65) Prior Publication Data
US 2012/0262033 A1    Oct. 18, 2012

(30) Foreign Application Priority Data
Dec. 24, 2009   (JP) ................. 2009-291872

(51) Int. Cl.
   *H02K 1/28*      (2006.01)
   *H02K 15/02*     (2006.01)
   *H02K 11/00*     (2006.01)
   *H02K 24/00*     (2006.01)

(52) U.S. Cl.
CPC .............. *H02K 1/28* (2013.01); *H02K 11/0031* (2013.01); *H02K 15/028* (2013.01); *H02K 24/00* (2013.01)
USPC .................................... 310/68 B; 310/156.09

(58) Field of Classification Search
CPC . H02K 1/28; H02K 11/0015; H02K 11/0031; H02K 15/028; H02K 15/03
USPC ................ 310/68 B, 156.08, 156.09; 29/598
See application file for complete search history.

(56) References Cited

FOREIGN PATENT DOCUMENTS

| JP | 5-300679 | A | 11/1993 | | |
|---|---|---|---|---|---|
| JP | 7-218517 | A | 8/1995 | | |
| JP | 08-279424 | A | 10/1996 | | |
| JP | 10-066287 | A | 3/1998 | | |
| JP | 2004-048925 | A | 2/2004 | | |
| JP | 2004048925 | A | * 2/2004 | ............... | H02K 1/28 |
| JP | 2006-158005 | A | 6/2006 | | |
| JP | 2007-064870 | A | 3/2007 | | |
| JP | 2007-124752 | A | 5/2007 | | |
| JP | 2007124752 | A | * 5/2007 | ............... | H02K 1/28 |
| JP | 2008-268065 | A | 11/2008 | | |
| JP | 2008-275385 | A | 11/2008 | | |

OTHER PUBLICATIONS

Machine translation of JP2007-124752A (May 2007).*
Machine translation of JP2004-048925A (Feb. 2004).*
International Search Report of PCT/JP2010/060980 mailed Sep. 14, 2010.

* cited by examiner

*Primary Examiner* — Michael Andrews
(74) *Attorney, Agent, or Firm* — Kenyon & Kenyon LLP (57) ABSTRACT

A motor rotor and a method for manufacturing a motor rotor, enabling crimping of the resolver rotor at low cost with less influence on the detection accuracy. A motor rotor includes a resolver rotor and a rotor shaft to which the resolver rotor is affixed by crimping. The rotor shaft includes a first stepped section with which a crimping punch makes contact to deform the first stepped section, a second stepped section with which an end surface of the resolver rotor makes contact, and a cutout groove formed in a surface which is located near the first stepped section and with which an inner peripheral hole section of the resolver rotor makes contact. In the crimping operation, the first stepped section of the rotor shaft is bent within the cutout groove to form a crimping protrusion which presses the end surface of the resolver rotor.

4 Claims, 12 Drawing Sheets

MOTOR ROTOR INCLUDING A RESOLVER ROTOR FOR DETECTING ROTATION POSITION

CROSS-REFERENCE TO RELATED APPLICATIONS

This is a 371 national phase application of PCT/JP2010/060980 filed on 28 Jun. 2010, which claims priority to Japanese Patent Application No. 2009-291872 filed 24 Dec. 2009, the entire contents of which are incorporated herein by reference.

FIELD OF THE INVENTION

The present invention relates to a technique for fixing a resolver rotor provided in a motor rotor to a shaft of the motor rotor.

BACKGROUND OF THE INVENTION

Vehicles that use motors as a power source such as hybrid cars and electric cars have increased in recent years. In a motor used as a power source, a resolver is often used as a rotation sensor for detecting rotation position of a rotary shaft of the motor for accurate position control. This resolver includes a resolver rotor fixed to the shaft of the rotor of the motor, and a resolver stator mounted in a case supporting the rotary shaft.

Mounting accuracy, etc. of these parts are essential requirements for ensuring detection accuracy of the resolver, and various approaches are under consideration.

Patent Document 1 discloses a technique relating to a resolver rotor.

Disclosed is a structure in which a shaft is provided with a stepped portion, and a rotor, a bush, and a rotary transformer are mounted in a stacking manner on the shaft. An end portion of the shaft is deformed by crimping or clinching such as to cover one end of the rotary transformer, whereby the rotor, bush, and rotary transformer are held on the shaft.

The structure for the shaft, rotor, bush, and rotary transformer is thus simplified to improve ease of assembly and to enable cost reduction.

Patent Document 2 discloses a technique relating to a rotor of a magnet generator.

In a joint between a boss and an iron cup of the rotor of the magnet generator, when the boss, which is fixed to a rotary drive shaft, is fixed to the iron cup that is arranged concentrically on the outer periphery of the boss and having permanent magnets on its inner circumferential surface, an outer peripheral portion of the boss and an inner peripheral portion of the iron cup make contact with each other, and the iron cup also abuts on an iron cup receiving portion provided on one side of the outer peripheral portion of the boss. Further, a crimped portion provided on the other side of the outer peripheral portion is deformed so that the boss is axially fixed to the iron cup. This joint between the outer peripheral portion and the inner peripheral portion is located in a position where the radial tensile stress caused by an axial load will be minimum.

Patent Document 3 discloses a technique relating to a fixture structure of a resolver rotor.

The resolver rotor is provided with a plurality of cut-outs in an inner peripheral hole section and is disposed at a predetermined position relative to a shaft. Resin parts are then formed by injection molding for the purpose of retaining the rotor core to the shaft, so that the cut-outs formed in the hole of the resolver rotor are also filled with resin flowing therein. As a result, resin layers are formed on both sides in the direction of rotation axis of the resolver rotor, so that the resolver rotor is integrally held on the shaft. A key formed in the hole of the resolver rotor is fitted in a key groove formed in the shaft to prevent displacement of the resolver rotor relative to the shaft in the rotating direction.

Patent Document 4 discloses a technique relating to a fixture structure of a rotation angle sensor.

Disclosed is a structure in which a resolver rotor is lightly press-fitted onto a stepped portion provided in a motor rotor, and a resilient ring and a pressing ring are mounted thereon and pressure is applied, so that the resolver rotor is fixed to the motor rotor. The friction between the resilient ring and the pressure ring holds the resolver rotor on the motor rotor.

RELATED ART DOCUMENTS

Patent Documents

Patent Document 1: JP 8(1996)-279424A
Patent Document 2: JP 10(1998)-066287A
Patent Document 3: JP 2006-158005A
Patent Document 4: JP 2007-064870A

SUMMARY OF THE INVENTION

Problem to be Solved by the Invention

However, there seem to be the following problems in the techniques disclosed in Patent Documents 1 to 4.

Patent Documents 1 and 2 relate to methods of holding the resolver rotor by crimping the shaft or the boss thereto. However, the shaft or the boss is a metal part, and crimping such metal parts together applies a force on the resolver rotor that acts to expand the inner diameter of the resolver rotor.

If, as a result of this, the resolver rotor is deformed more than a certain level, it may possibly affect detection accuracy of the resolver due to errors in its electrical output signals since the resolver detects the number of rotation from phases of rotation.

With the method shown in Patent Document 3 in which resin extends through the cut-out portions, there is a possibility that the cut-outs may cause errors in electrical signals depending on their size.

Another problem that will arise is that the resolver rotor needs to have a larger outer shape since it requires the cut-out portions in the inner circumference.

Using the method shown in Patent Document 4 is considered to solve the problems of resolver accuracy encountered by Patent Documents 1 to 3, but the method requires the resilient ring and the ferrule for mounting the resolver rotor to the motor rotor.

Namely, the motor rotor uses a larger number of components. With the increase in components, the number of process steps would be increased, which would obstruct cost reduction.

To solve these problems, an object of the present invention is to provide a motor rotor that allows low-cost crimping of a resolver rotor without much affecting detection accuracy of the resolver, and a method of manufacturing the motor rotor.

Means to be Solved by the Problem

To achieve the above object, the motor rotor according to one aspect of the present invention has the following characteristics:

(1) A motor rotor includes a resolver rotor for detecting a rotation position, and a shaft crimped to the resolver rotor, wherein the shaft includes a first stepped portion to be deformed by a punch abutting thereon during crimping, a second stepped portion to which an end face of the resolver rotor is abut, and a recess formed close to the first stepped portion and in a surface contacted by a circumferential inner hole of the resolver rotor, wherein, when the shaft is crimped to the resolver rotor, the first stepped portion of the shaft is buckled in a middle of the recess by a punch, forming a crimping protrusion deformed and protruding from the first stepped portion, so that the crimping protrusion presses the end face of the resolver rotor.

(2) A motor rotor includes a resolver for detecting a rotation position, and a shaft crimped to the resolver rotor, wherein the shaft includes a first stepped portion to be deformed by a punch abutting thereon during crimping, a second stepped portion to which an end face of the resolver rotor is abut, and a recess formed close to the first stepped portion and in a surface contacted by a circumferential inner hole of the resolver rotor, wherein, when the shaft is crimped to the resolver rotor, the first stepped portion of the shaft is deformed by the punch and buckled inside the recess, forming a crimping protrusion deformed and protruding from the first stepped portion, so that the crimping protrusion presses the end face of the resolver rotor, wherein the recess of the shaft includes a first recess and a second recess formed to overlap the first recess, and the second recess is formed closer to the first stepped portion than the first recess, and an angle made between an inner surface of the second recess and an outer circumferential surface of the shaft is smaller than an angle made between the first recess and the shaft.

(3) In the motor rotor set forth in (2), preferably, the resolver rotor is formed of a plurality of steel plates stacked one on another, and one of the steel plate located at the end face of the resolver rotor abutted by the crimping protrusion is formed with an oval hole at a position corresponding to the crimping protrusion.

(4) In the motor rotor set forth in (2) or (3), preferably, the crimping protrusion is formed to protrude on the shaft at four locations on sides of a minor axis of the resolver rotor formed substantially in an oval shape.

To achieve the above object, the motor rotor manufacturing method according to one aspect of the present invention has the following characteristics:

(5) A method of manufacturing a motor rotor wherein a resolver rotor is fitted onto an outer side of a shaft and the shaft is crimped using a punch abutted thereon, the method comprises: mounting the resolver rotor onto the shaft, abutting one end face of the resolver rotor on a second stepped portion formed in the shaft, abutting the punch on a first stepped portion formed in the shaft, and applying pressure so that the first stepped portion is buckled in a middle of a recess formed near the first stepped portion and on an outer circumferential surface of the shaft contacted by an peripheral hole section of the resolver rotor, and a crimping protrusion deformed and protruded from the first stepped portion abuts on the other end face of the resolver rotor.

Effects of the Invention

The motor rotor according to the above aspect of the present invention having such characteristics provides the following advantageous actions and effects.

In the above aspect of the invention described in (1), a motor rotor includes a resolver rotor for detecting a rotation position, and a shaft crimped to the resolver rotor, wherein the shaft includes a first stepped portion to be deformed by a punch abutting thereon during crimping, a second stepped portion to which an end face of the resolver rotor is abut, and a recess formed close to the first stepped portion and in a surface contacted by a circumferential inner hole of the resolver rotor, wherein, when the shaft is crimped to the resolver rotor, the first stepped portion of the shaft is deformed by the punch and buckled inside the recess, forming a crimping protrusion deformed and protruding from the first stepped portion, so that the crimping protrusion presses the end face of the resolver rotor.

When crimping or clinching the shaft and the resolver rotor together, if the shaft is crimped by the techniques shown in Patent Documents 1 and 2, there will be a metal flow caused by the crimping as will be described later and illustrated in FIG. 12, the metal flow directly causing the inner diameter of the resolver rotor to expand outwardly. As a result, there is a risk that the detection accuracy of the resolver will be affected as mentioned in the problems to be solved.

However, providing the recess close to the first stepped portion and in the surface contacted by the circumference portion of the inner hole of the resolver rotor can reduce the possibility of a metal flow being created in a direction in which the shaft diameter is increased. This is because the crimping protrusion is formed by the punch such that it buckles in the middle of the recess, as a result of which the crimping protrusion acts on the resolver rotor such as to press the end face of the resolver rotor from the axial direction of the shaft.

Thus it is less likely that a metal flow is created in a direction in which the shaft diameter is increased, or that the force that radially expands from the inside diameter of the resolver rotor is created, whereby adverse effects by the crimping on the detection accuracy of the resolver are minimized.

Also, since the resolver rotor is fixed by crimping the shaft, no new components are necessary, and this can contribute to cost reduction of the motor rotor.

In the above aspect of the invention described in (2), in the motor rotor (1), the recess of the shaft includes a first recess and a second recess formed to overlap the first recess, and the second recess is formed closer to the first stepped portion than the first recess, and an angle made between an inner surface of the second recess and an outer circumferential surface of the shaft is smaller than an angle made between the first recess and the shaft.

The first stepped portion buckles more easily in the middle of the recess when pressed by the punch, with an angle made between the recess and the outer surface of the shaft being smaller. This consequently causes the crimping protrusion to easily act on the end face of the resolver rotor from the axial direction of the shaft, whereby adverse effects on the detection accuracy of the resolver are reduced.

In the above aspect of the invention described in (3), in the motor rotor (1) or (2), the resolver rotor is formed of a plurality of steel plates stacked one on another, and one of the steel plate located at the end face of the resolver rotor abutted by the crimping protrusion is formed with an oval hole at a position corresponding to the crimping protrusion.

A force radially acting on the resolver rotor when pressure is applied to the crimping protrusion abutting on the resolver rotor will lead to an increase in the resolver rotor diameter, which in turn will deteriorate the detection accuracy of the resolver.

Therefore, an oval hole is provided at a position corresponding to the crimping protrusion in a steel plate at the end of the resolver rotor which is preliminarily formed by stacking a plurality of steel plates so as to provide a buffer zone for absorbing an increase in the resolver rotor diameter, whereby deterioration of resolver accuracy can be reduced.

In the above aspect of the invention described in (4), in the motor rotor of one of (1) to (3), the crimping protrusion is formed to protrude on the shaft at four locations on sides of a minor axis of the resolver rotor formed substantially in an oval shape.

A resolver rotor used in a resolver, if it has an oval shape, has more factors that affect the detection accuracy on the sides of a major axis, i.e., on the side located closer to the resolver stator.

Accordingly, providing crimping protrusions to protrude at four locations on the sides of a minor axis where they are less likely to affect the detection accuracy can contribute to better resolver detection accuracy.

The motor rotor manufacturing method according to one aspect of the present invention having such characteristics provides the following advantageous effects.

In the above aspect of the invention described in (5), a method of manufacturing a motor rotor wherein a resolver rotor is fitted onto an outer side of a shaft and the shaft is crimped using a punch abutted thereon, comprises: mounting the resolver rotor onto the shaft, abutting one end face of the resolver rotor on a second stepped portion formed in the shaft, abutting the punch on a first stepped portion formed in the shaft, and applying pressure so that the first stepped portion is buckled inside a recess formed on an outer circumferential surface of the shaft contacted by an peripheral hole section of the resolver rotor, and a crimping protrusion deformed and protruded from the first stepped portion abuts on the other end face of the resolver rotor.

When fixing the resolver rotor to the shaft by crimping, the punch abuts on the first stepped portion to form a crimping protrusion which will buckle in the middle of the recess, so that it is less likely that the resolver rotor is subjected to a force that radially expands from the inner diameter of the resolver rotor.

Thus a motor rotor manufacturing method for fixing a resolver rotor to a shaft by crimping without affecting the resolver detection accuracy can be provided.

Also, since the method does not involve an increase in the number of components as with Patent Document 4, the method can contribute to cost reduction.

DETAILED DESCRIPTION

First, a first embodiment of the present invention will be described.

First Embodiment

Figure 1:
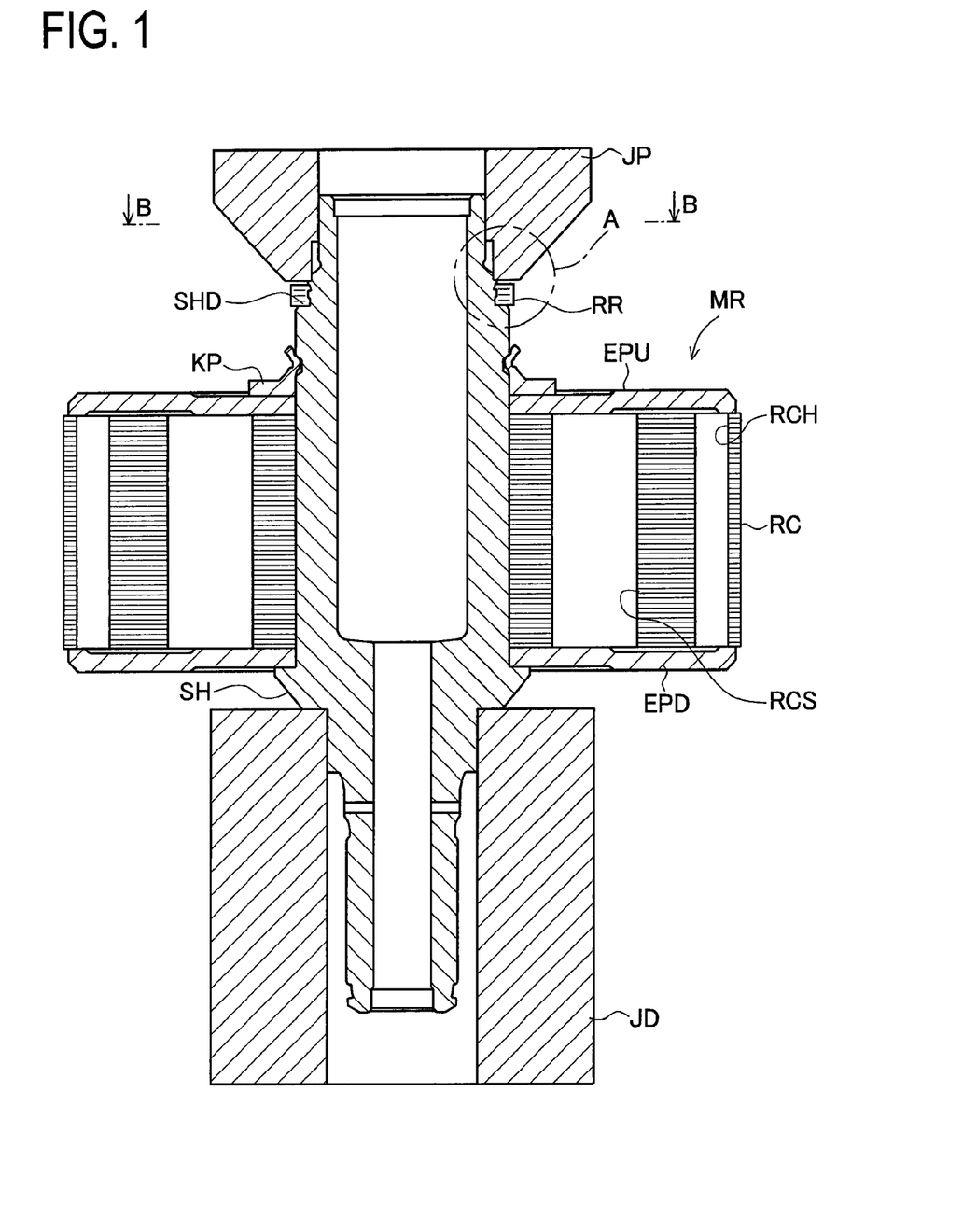
FIG. 1 is a cross-sectional view of a rotor shaft being crimped to a resolver rotor in a first embodiment.

FIG. 1 shows a cross-sectional view of a rotor shaft SH being fixed by crimping or clinching to a resolver rotor RR in the first embodiment.

Figure 2:
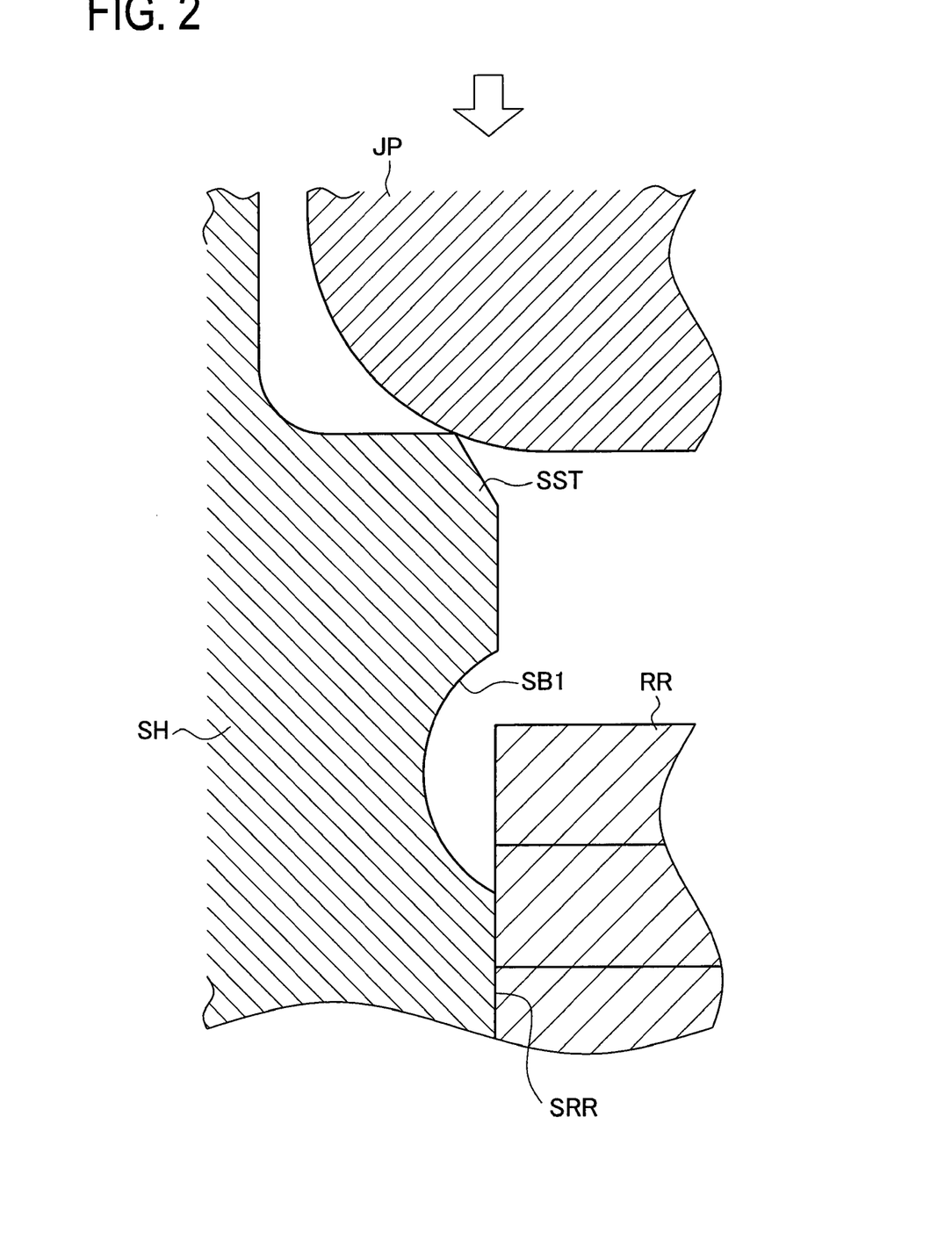
FIG. 2 is a partial enlarged view of the rotor shaft of the first embodiment.

FIG. 2 shows a partial enlarged view of the rotor shaft SH, showing a part A in FIG. 1 to a larger scale.

Figure 3:
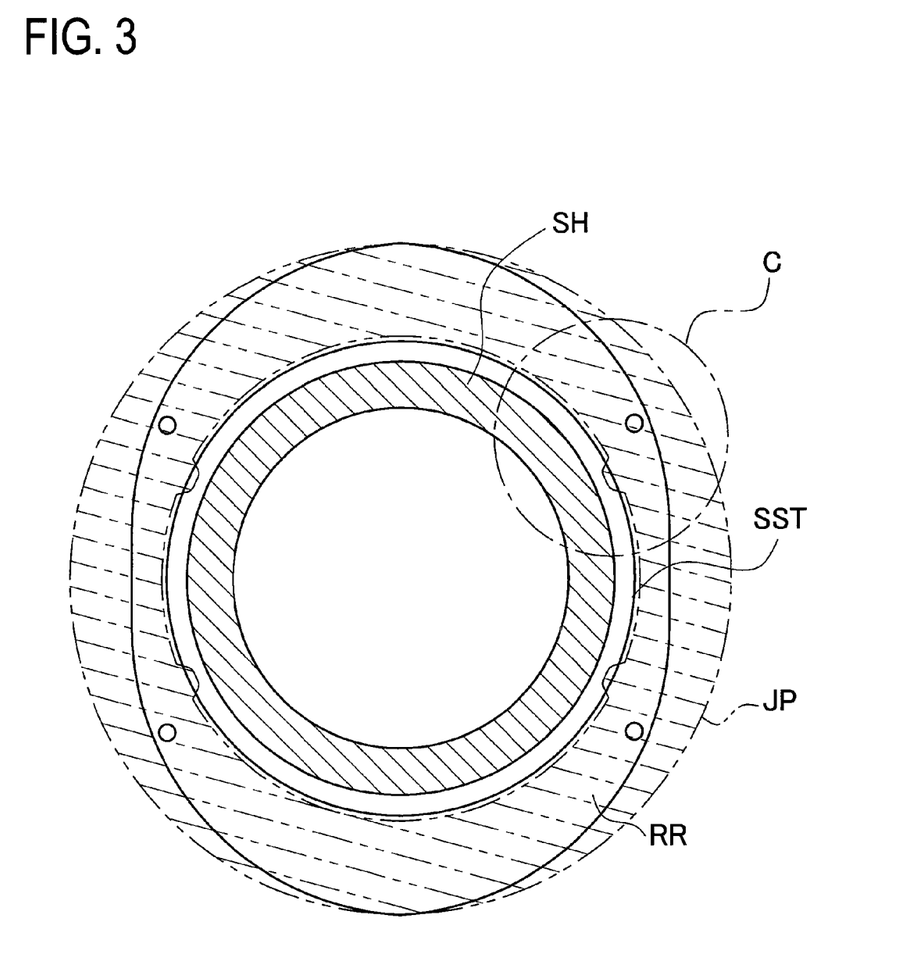
FIG. 3 is a cross-sectional view of the rotor shaft and a tool of the first embodiment.

FIG. 3 shows a cross-sectional view of the rotor shaft SH and a tool, corresponding to a section along B-B in FIG. 1 viewed in the direction of arrows. For convenience of explanation, a crimping punch JP is indicated by an imaginary line.

Figure 4:
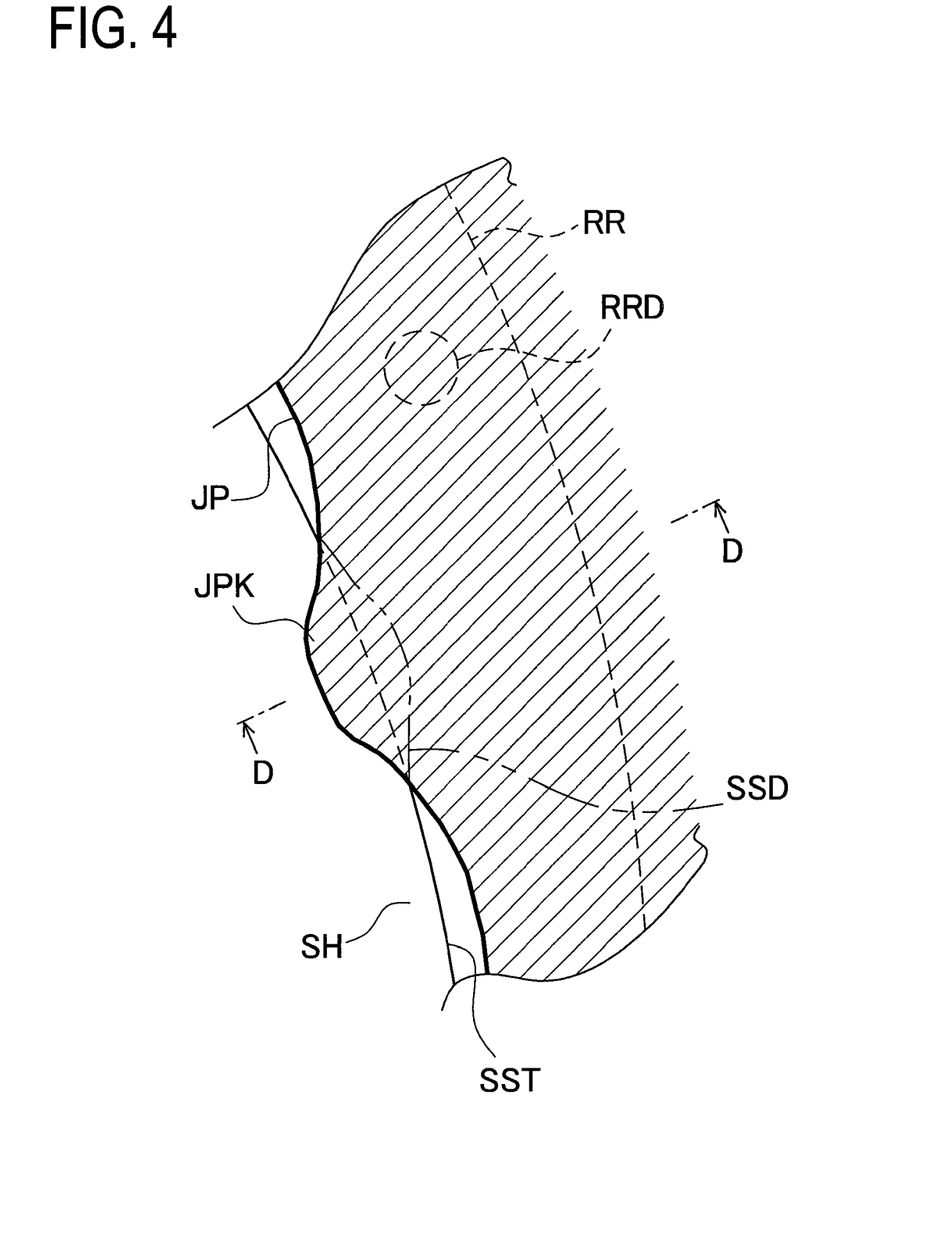
FIG. 4 is an enlarged view of a portion of a crimping punch of the first embodiment.

FIG. 4 shows an enlarged view of a portion of the crimping punch JP. Although it is an enlarged view of part C in FIG. 3, FIG. 3 and FIG. 4 represent the part somewhat differently for convenience of explanation.

Figure 5:
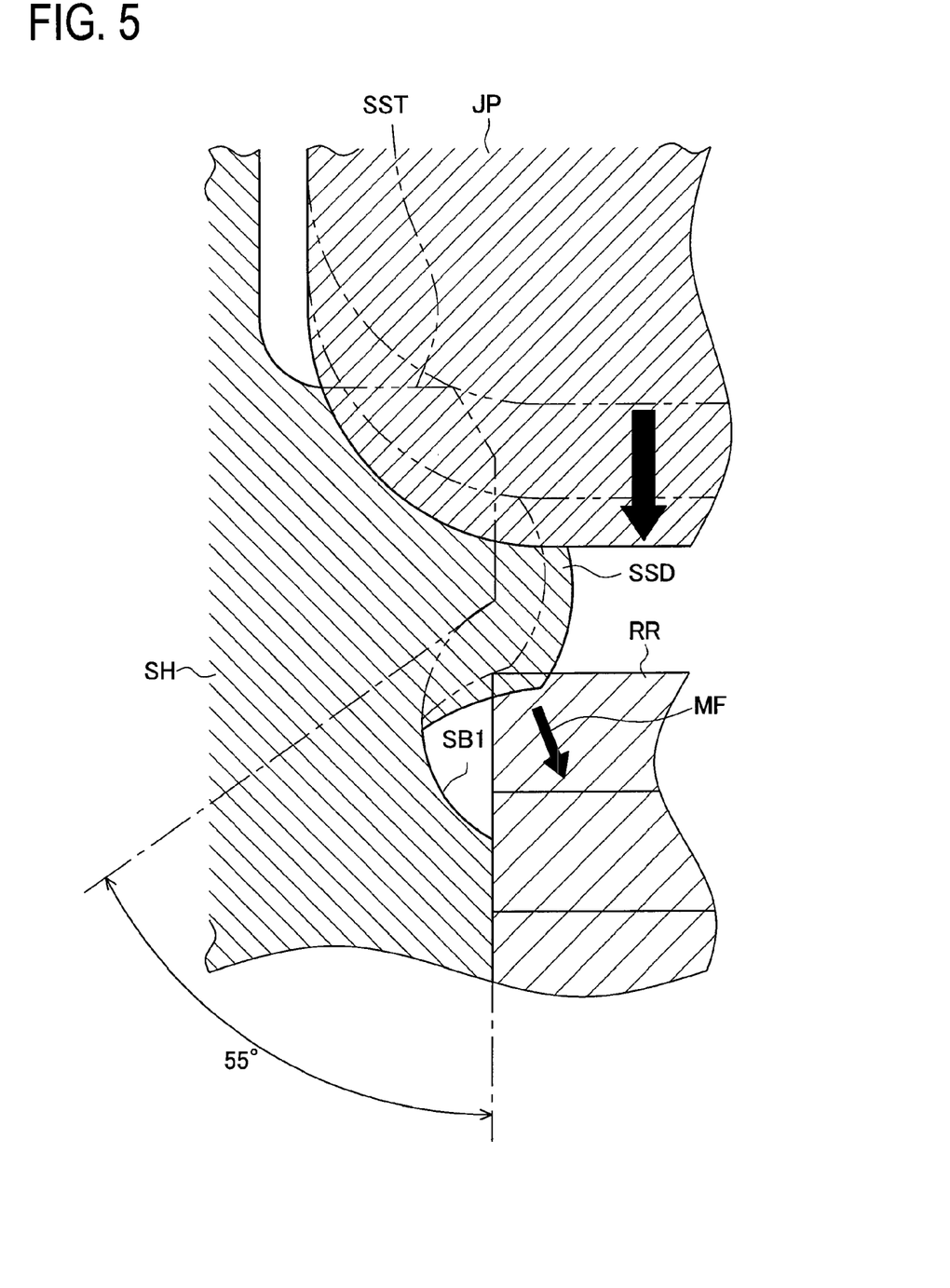
FIG. 5 is an enlarged cross-sectional view of a portion of the crimping punch of the first embodiment.

FIG. 5 shows an enlarged cross-sectional view of a portion of the punch, corresponding to a section along D-D in FIG. 4 viewed in the direction of arrows.

The motor rotor MR is a constituent part of a rotary electric machine (not shown) used with a motor stator (not shown), and it is provided with a resolver (not shown) for detecting the rpm of the rotary electric machine. For this reason, the resolver rotor RR is provided to an end of the motor rotor MR.

A rotor core RC is sandwiched between a first end plate EPD and a second end plate EPU and further pressed and held by a crimped plate KP on the rotor shaft SH for the motor rotor MR.

The rotor core RC is formed by a plurality of steel plates stacked upon one another. The rotor core RC is formed with insertion holes RCH for receiving permanent magnets (not shown) and through holes RCS.

The rotor shaft SH is formed with a first stepped portion SST, a cut-out groove SB1, and a second stepped portion SHD, as shown in FIG. 1 and FIG. 2. The first stepped portion SST and the cut-out groove SB1 are formed in an upper end portion of a rotor-holding outer peripheral portion SRR for holding the resolver rotor RR. The second stepped portion SHD shown in FIG. 1 is formed below the first stepped portion SST and the cut-out groove SB1 to hold the resolver rotor RR, i.e., formed on the side on which the rotor core RC is provided. Although not described, another stepped portion is formed to hold the rotor core RC.

The cut-out groove SB1 is a groove cut in an angle of 55 degrees from an outer circumferential surface of the rotor shaft SH (the rotor-holding outer peripheral portion SRR). The shape of this groove is determined by the shape of a cutting bite used when forming the rotor shaft SH. Therefore, the cut-out groove SB1 can be formed at the same time when forming the rotor shaft SH.

The resolver rotor RR is joined to one end of the rotor shaft SH by crimping or clinching. The resolver rotor RR functions as a resolver in pair with the resolver stator (not shown).

The resolver rotor RR mounted to the rotor shaft SH is formed by stacking a plurality of electromagnetic steel plates.

For mounting the resolver rotor RR to the rotor shaft SH by crimping, the rotor shaft SH is placed in a crimping die JD, and part of the rotor shaft SH is pressed and deformed by a crimping punch JP.

The crimping punch JP is connected to a thrust generating device such as a hydraulic press (not shown) so as to have a function of moving up and down vertically in the axial direction of the crimping die JD. The crimping punch JP is formed with punch protrusions JPK as shown in FIG. 4 at four locations to crimp the first stepped portion SST of the rotor shaft SH. Therefore, the punch protrusions JPK are the only portions that actually abut on the first stepped portion SST when crimping the first stepped portion SST with the crimping punch JP.

With the crimping punch JP, accordingly, the outer circumference of the rotor shaft SH is crimped or deformed at four locations as shown in FIG. 3 and FIG. 4.

The first stepped portion SST formed in the rotor shaft SH is pressed and deformed by the crimping punch JP (punch protrusions JPK) as shown in FIG. 5. At this time, because of the cut-out groove SB1 formed in the outer circumferential surface of the rotor shaft SH and close to the first stepped portion SST, the first stepped portion SST is deformed such as to buckle in the middle of the cut-out groove SB1 as shown in FIG. 5, thus abutting on the resolver rotor RR. With the crimping punch JP (punch protrusions JPK) abutting on the first stepped portion SST in this manner, the first stepped portion SST of the rotor shaft SH is deformed to form crimping protrusions SSD.

After that, the crimping protrusions SSD abut on the resolver rotor RR such as to cover part of the end face of the resolver rotor RR, and the crimping protrusions SSD press the resolver rotor RR as shown in FIG. 5. It is assumed that, at this time, a metal flow MF is created inside the resolver rotor RR in a manner shown in FIG. 5.

As a result, the resolver rotor RR is sandwiched between the second stepped portion SHD and the crimping protrusions SSD and held on the rotor shaft SH.

The motor rotor MR of the first embodiment, having the configuration described above, provides the following advantageous actions and effects.

Firstly, reduction in resolver accuracy can be minimized.

The motor rotor MR of the first embodiment includes the resolver rotor RR for detecting a rotation position, and the rotor shaft SH fixed by crimping to the resolver rotor RR, the rotor shaft SH including the first stepped portion SST deformed by the crimping punch JP abutting thereon during crimping, the second stepped portion SHD to abut on the end face of the resolver rotor RR, and the cut-out groove SB1 formed close to the first stepped portion SST and in the surface contacted by the circumferential portion of the inner hole of the resolver rotor RR, wherein, when the rotor shaft SH is crimped to the resolver rotor RR, the first stepped portion SST of the rotor shaft SH is deformed by the crimping punch JP and buckled inside the cut-out groove SB1, thereby forming the crimping protrusion SSD by thus being deformed, and this protruding crimping protrusion SSD presses the end face of the resolver rotor RR.

Figure 12:
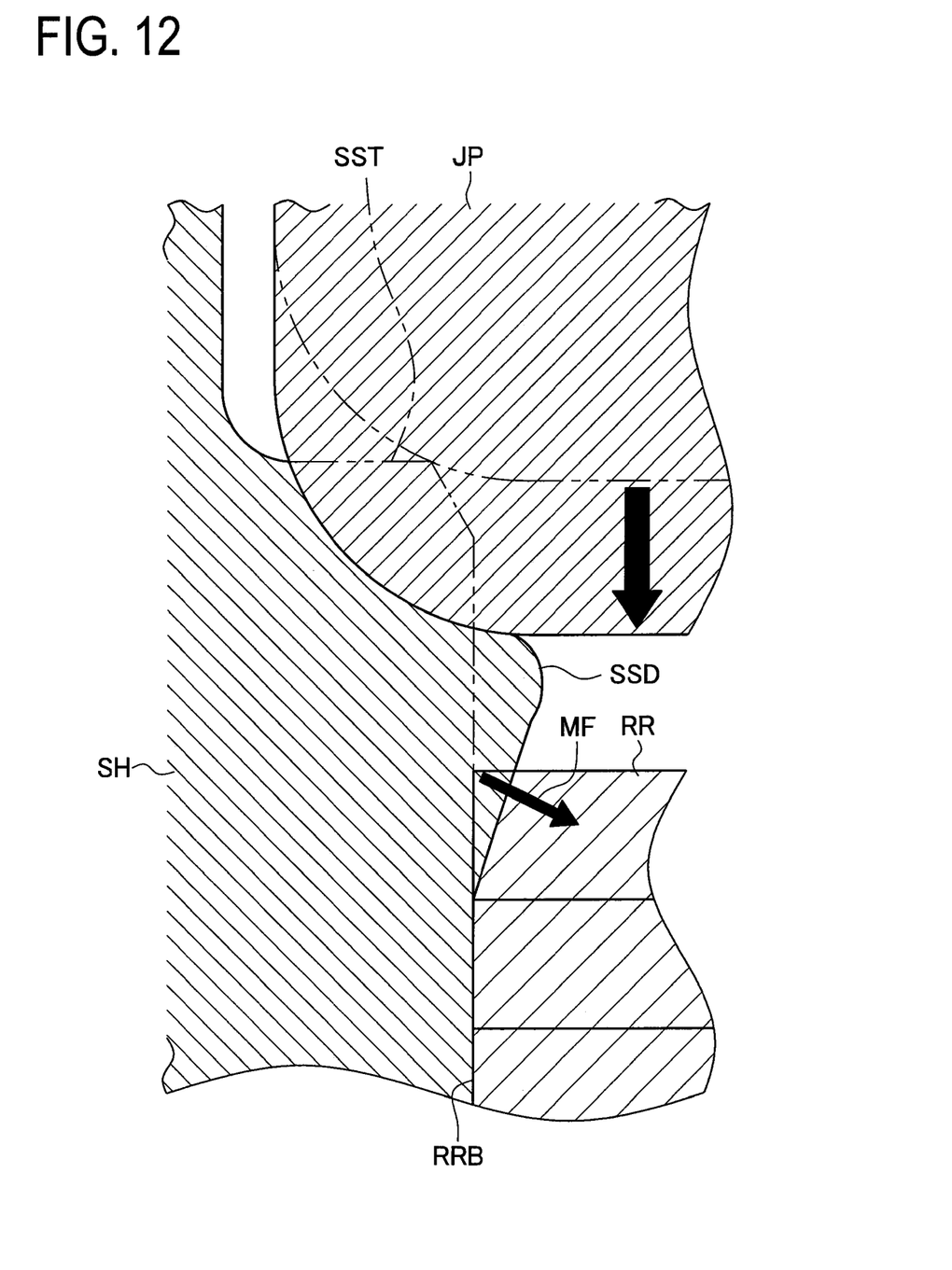
FIG. 12 is a cross-sectional view showing how a resolver rotor is fixed to a shaft by a conventional crimping technique.

FIG. 12 shows a cross-sectional view showing how a resolver rotor RR is fixed to a rotor shaft SH by a conventional crimping technique.

A first stepped portion SST of the rotor shaft SH is deformed by a punch protrusion JPK of the crimping punch JP abutting thereon, to form a crimping protrusion SSD.

However, as there is created a metal flow MF in the direction of an arrow indicated in FIG. 12 inside the resolver rotor RR, the resolver rotor RR is deformed in a radial direction. Namely, the inner diameter RRB of the resolver rotor RR is expanded radially outwards.

More than a predetermined degree of such deformation may cause errors in electrical output signals of the resolver.

In contrast, the rotor shaft SH of the motor rotor MR in the first embodiment is provided with the cut-out groove SB1, so that the metal flow MF is created primarily along the axial direction of the rotor shaft SH as shown in FIG. 5. The metal flow MF is less likely to be created in the radial direction of the resolver rotor RR. Accordingly, troubles as with the example of FIG. 12 are unlikely to occur.

Thus the force that radially extends from the inside diameter of the resolver rotor RR is made less likely to be created, so that adverse effects on the detection accuracy of the resolver are minimized.

Another advantage with the use of the motor rotor MR of the first embodiment is that the production cost can be reduced.

It is known that the mounting accuracy of the resolver relative to the motor rotor can be improved with a process using a resilient ring and a pressing ring as shown in Patent Document 4. However, such an increase in the number of components will increase the number of process steps, and also this method requires the cost of components themselves, which obstructs cost reduction.

However, the motor rotor MR of the first embodiment avoids the problems associated with the crimping by forming the cut-out groove SB1 in the rotor shaft SH as described above.

This cut-out groove SB1 is formed with a commonly used processing bite of a processing machine used when forming the rotor shaft SH, with the angle made between the surfaces of the rotor shaft SH and the cut-out groove SB1 being 55 degrees.

Therefore, the cut-out groove SB1 can be formed during formation of the rotor shaft SH without even replacing the processing bite, and forming the cut-out groove SB1 requires hardly any processing time, so that the problems with the crimping can be solved without any cost increase.

Next, a second embodiment of the present invention will be described.

Second Embodiment

The second embodiment of the present invention has substantially the same configuration as that of the first embodiment, except for some difference in the shape of the cut-out groove SB1 formed in the rotor shaft SH and the shape of the resolver rotor RR. This will be explained below.

Figure 6:
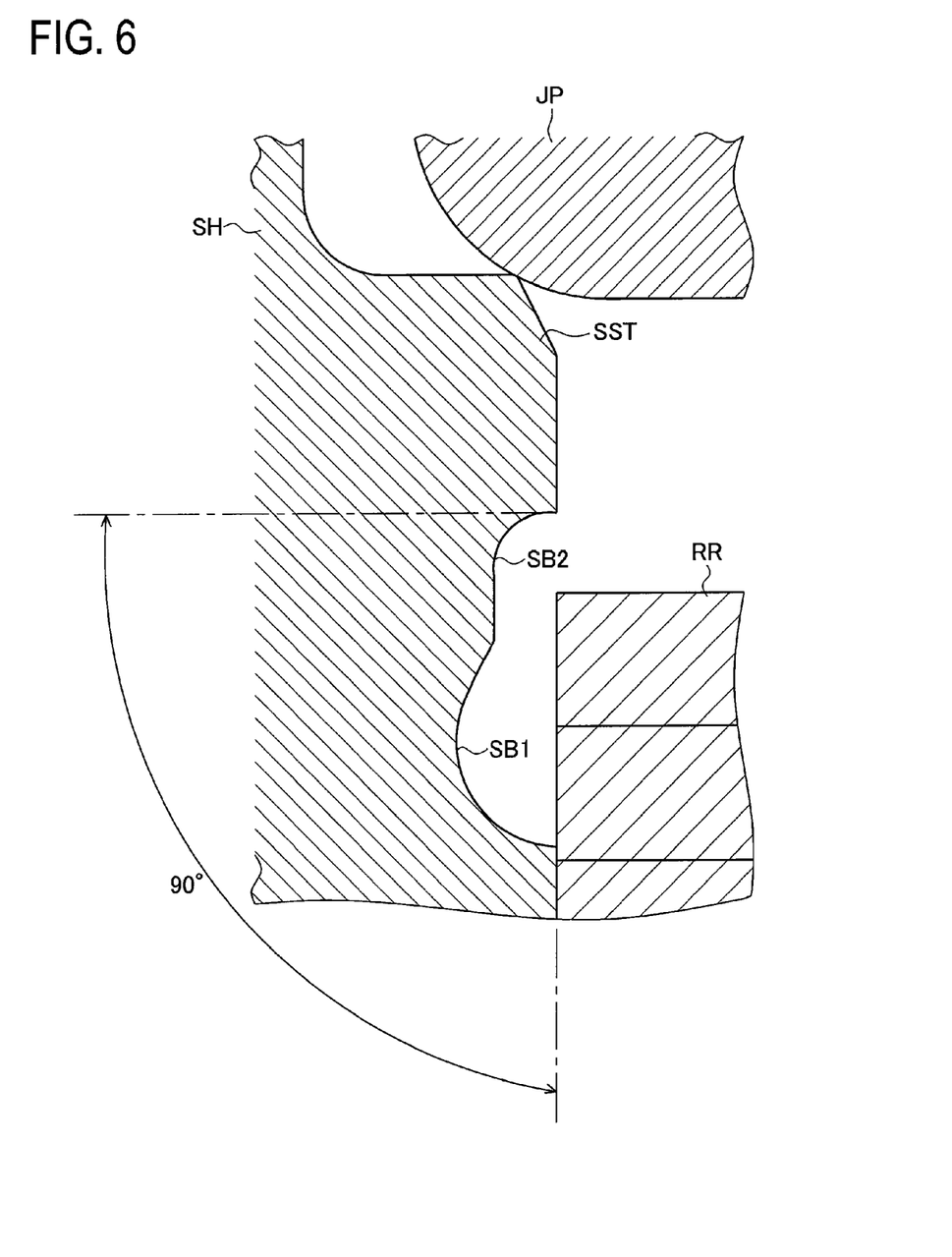
FIG. 6 is a cross-sectional view of a rotor shaft in a second embodiment.

FIG. 6 shows a cross-sectional view of the rotor shaft SH of the second embodiment. It corresponds to FIG. 5.

The rotor shaft SH of the second embodiment has an additional cut-out groove SB2 formed continuously with the cut-out groove SB1. The additional cut-out groove SB2 is formed in the rotor shaft SH in such a shape that the angle made by itself and the rotor shaft SH is 90 degrees. The cut-out groove SB2 is provided by use of a tool called a grooving bite. Therefore, the cut-out groove SB2 needs to be formed in an additional process step after the formation of the cut-out groove SB1 in the rotor shaft SH.

Figure 7:
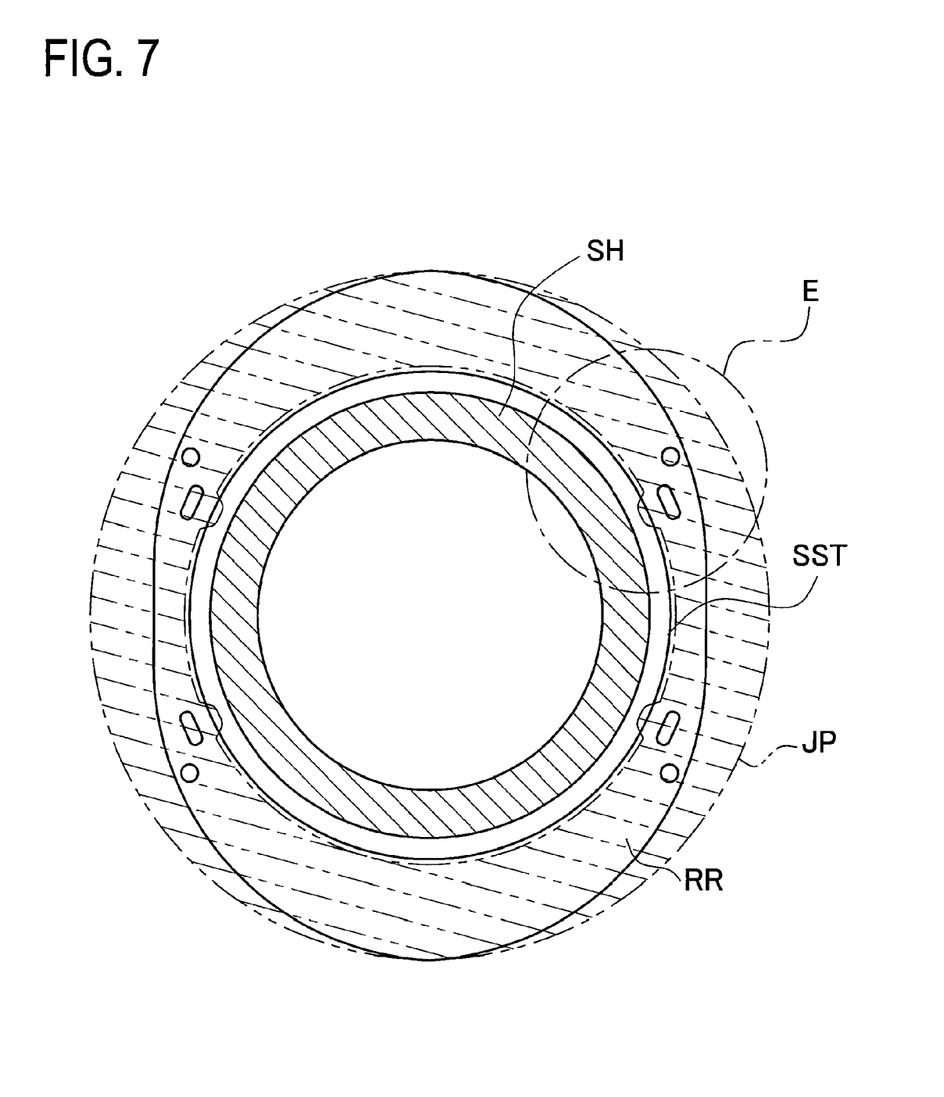
FIG. 7 is a cross-sectional view of the rotor shaft and a tool of the second embodiment.

FIG. 7 shows a cross-sectional view of the rotor shaft SH and a tool. It corresponds to FIG. 3.

Figure 8:
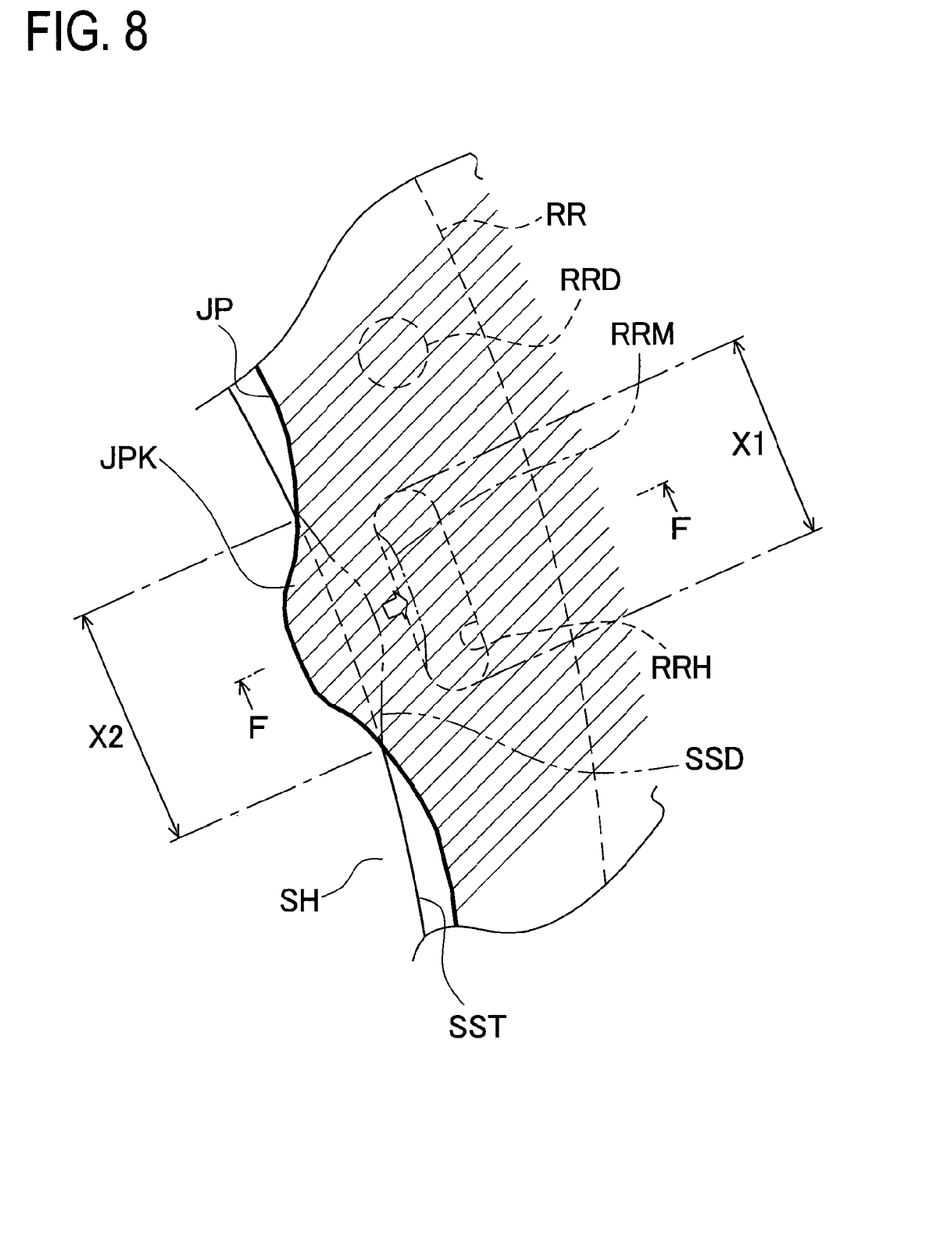
FIG. 8 is an enlarged view of a portion of a crimping punch of the second embodiment.

FIG. 8 shows an enlarged view of a portion of the crimping punch JP. It corresponds to FIG. 4. FIG. 8 is an enlarged view of part E shown in FIG. 7.

Meanwhile, the resolver rotor RR is formed with oval escape grooves RRH in portions in the outer circumference of the parts where the rotor shaft SH is crimped to the resolver rotor RR. The escape grooves RRH are provided in an uppermost one of the stacked steel plates of the resolver rotor RR.

Further, the escape grooves RRH are provided such that two each of them are positioned between two of dowels RRD provided at four locations of the resolver rotor RR. This is because providing them on the sides of a minor axis of the oval-shaped resolver rotor RR does not affect the detection accuracy of the resolver (not shown) as much as on the side of a major axis.

A width X1 of each oval-shaped escape groove RRH in a long-side direction is set slightly smaller than a width X2 of each crimping protrusion SSD formed by the crimping punch JP, while the width in a short-side direction is set to about several millimeters. The width in the short-side direction, however, may be set otherwise as long as it is larger than the protruding amount of the deformed protrusions RRM shown in FIG. 8.

In addition, the shape of the escape grooves RRH needs not necessarily be the oval shape shown in FIG. 7 and FIG. 8. The grooves are oval here because they are machined using a cutting tool. With other methods such as punching with a press, the grooves may take other shapes. The shape does not matter as long as the grooves have a width that can accommodate the crimping protrusions SSD.

The motor rotor MR of the second embodiment, having the configuration described above, provides the following advantageous actions and effects.

Firstly, deterioration of resolver accuracy can be reduced even more than the first embodiment.

The motor rotor MR of the second embodiment includes a rotor shaft SH with a recess having a cut-out groove SB1 and an additional cut-out groove SB2 formed such as to overlap the cut-out groove SB1, the additional cut-out groove SB2 being formed closer to the first stepped portion SST than the cut-out groove SB1, and an angle made by an outer circumferential surface of the rotor shaft SH and an inner surface of the additional cut-out groove SB2 is smaller than that of the cut-out groove SB1.

Figure 9:
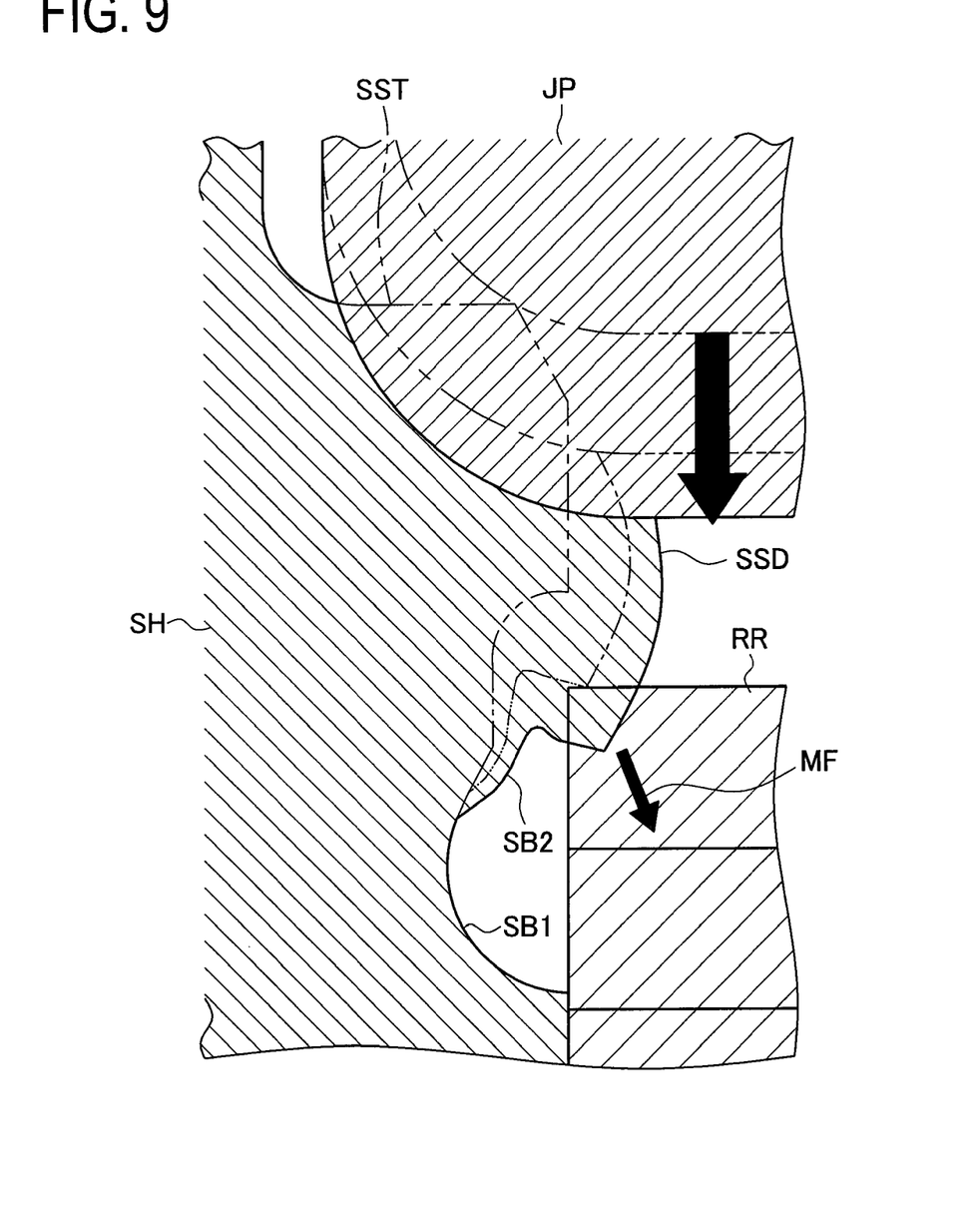
FIG. 9 is a cross-sectional view of the rotor shaft when pressed by the crimping punch in the second embodiment.

FIG. 9 shows a cross-sectional view of the rotor shaft SH when pressed by the crimping punch JP.

The angle made by the surface of the additional cut-out groove SB2 and the outer circumferential surface of the rotor shaft SH in the portion of the first stepped portion SST is 90 degrees, which is smaller than an angle of 125 degrees made by the surface of the cut-out groove SB1 and the outer circumferential surface of the rotor shaft SH in the portion of the first stepped portion SST (The angle is indicated as 55 degrees in FIG. 5.).

Therefore, when the first stepped portion SST is pressed by the crimping punch JP during crimping, the stepped portion can more readily buckle within the cut-out groove SB1 or the additional cut-out groove SB2, whereby the metal flow MF is created more in a direction orthogonal to the end face of the resolver rotor RR as shown in FIG. 9.

Accordingly, a force causing a deformation in the radial direction of the resolver rotor RR is made less likely to be created.

Figure 10:
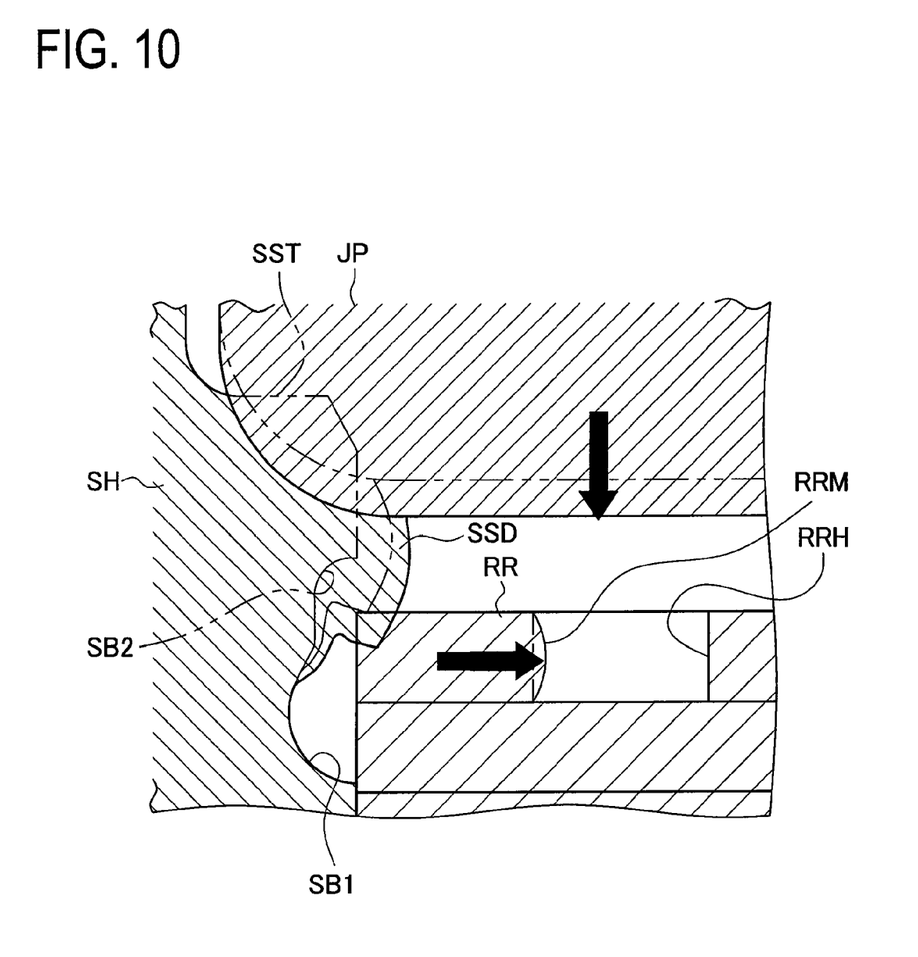
FIG. 10 is a cross-sectional view of the rotor shaft and the resolver rotor when pressed by the crimping punch in the second embodiment.

FIG. 10 shows a cross-sectional view of the rotor shaft SH and the resolver rotor RR when pressed by the crimping punch JP.

Also with the escape grooves RRH provided in the resolver rotor RR, the deformed protrusions RRM shown in FIG. 10 formed by deformation of the resolver rotor RR can be accommodated. Therefore, changes in the diameter of the resolver rotor RR can be suppressed.

Additionally, since the escape grooves RRH are formed in the first plate of the resolver rotor RR, they hardly attribute to reduction in detection accuracy of the resolver (not shown).

Figure 11:
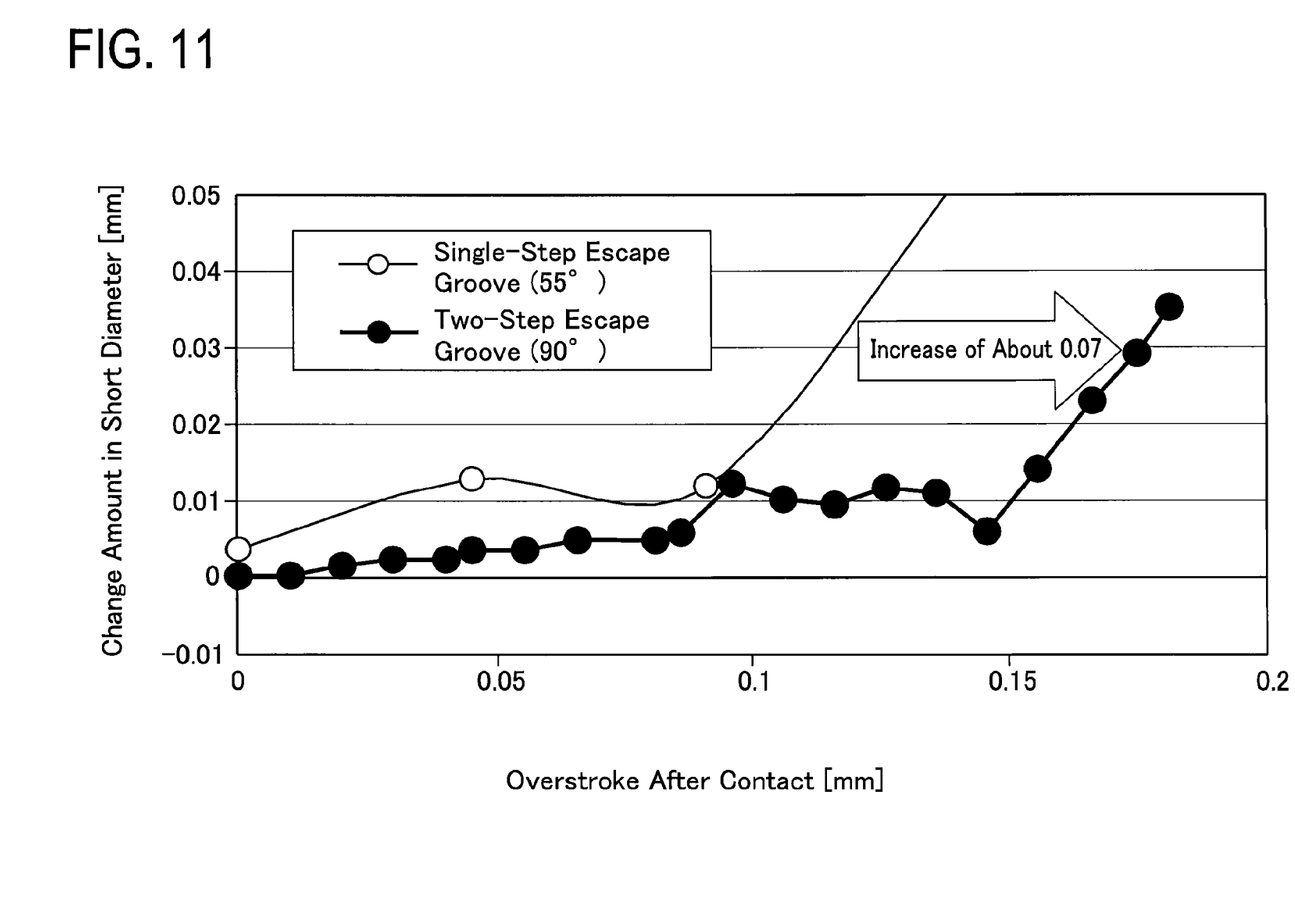
FIG. 11 is a graph indicating suppression of deformation in the resolver rotor during crimping in the second embodiment.

FIG. 11 is a graph indicating suppression of deformation in the resolver rotor during crimping.

The vertical axis represents the change amount in short diameter (minor diameter) of the resolver rotor RR, while the horizontal axis represents the amount of permissible overstroke after the crimping protrusions SSD have contacted the resolver rotor RR until the resolver rotor RR undergoes a change in its outer diameter. Both the example of the first embodiment with only the cut-out groove SB1 and the example of the second embodiment with the additional cut-out groove SB2 in addition to the cut-out groove SB1 are evaluated.

As shown in FIG. 11, with the additional cut-out groove SB2, the amount of permissible overstroke of the crimping protrusions SSD can be increased as compared with the example with only the cut-out groove SB1, and thereby deterioration of resolver accuracy that may be caused by fixing the resolver rotor RR to the rotor shaft SH can be suppressed.

While the present invention has been described in respect of embodiments, the invention is not limited to these embodiments and may be carried out with some parts of the configuration being suitably changed without departing from the subject matter of the invention.

For example, while the rotor shaft SH here is a hollow pipe, it may be a solid shaft. The rotor core RC may be fixed to the rotor shaft SH by directly crimping the second end plate EPU to the rotor shaft. The shapes of the crimping punch JP and the crimping die JD are also not particularly limited to the examples. Materials etc mentioned as examples may also be replaced with other materials etc having equivalent functions.

The shapes of the cut-out groove SB1 and additional cut-out groove SB2 need not necessarily be limited to those shown in the first and second embodiments. The same applies to the angles of the cut-out groove SB1 and additional cut-out groove SB2. For example, the angles can be made somewhat larger or smaller depending on the shape or the like of the bite tips without any problems. Further, the additional cut-out groove SB2 need not be shaped to be continuous with the cut-out groove SB1, and in fact the additional cut-out groove SB2 will be able to provide the same function even if provided alone. This is because the cut-out groove SB1 is provided for convenience of machining the additional cut-out groove SB2.

While, here, there are four crimped joints formed by the crimping punch JP, there will be no obstacle in increasing crimped joints or the crimping width. This is because the cut-out groove SB1 or the additional cut-out groove SB2 of the present invention will provide their functions even if the rotor shaft SH is crimped all around, if necessary.

DESCRIPTION OF THE REFERENCE SIGNS

EPD First end plate
EPU Second end plate
JD Caulking die
JP Caulking punch
JPK Punch protrusion KP Caulking plate
MF Metal flow
MR Motor rotor
RC Rotor core
RCH Insertion hole
RCS Through hole
RR Resolver rotor
RRB Inner diameter
RRD Dowel
RRH Escape groove
RRM Deformed protrusion
SB1 Cut-out groove
SB2 Additional cut-out groove
SH Rotor shaft
SHD Second stepped portion
SRR Rotor-holding outer peripheral portion
SSD Caulking protrusion
SST First stepped portion

The invention claimed is:

1. A motor rotor includes a resolver rotor for detecting a rotation position, and a shaft crimped to the resolver rotor,
wherein the shaft includes a first stepped portion to be deformed by a punch abutting thereon during crimping, a second stepped portion to which an end face of the resolver rotor is abutted, and a recess formed close to the first stepped portion and in a surface contacted by a circumferential inner hole of the resolver rotor,
wherein, when the shaft is crimped to the resolver rotor, the first stepped portion of the shaft is buckled in a middle of the recess by the punch, forming a crimping protrusion deformed and protruding from the first stepped portion, so that the crimping protrusion presses the end face of the resolver rotor,
wherein the recess of the shaft includes a first recess and a second recess formed to overlap the first recess, and
the second recess is formed closer to the first stepped portion than the first recess, and an angle made between an inner surface of the second recess and an outer circumferential surface of the shaft is smaller than an angle made between the first recess and the shaft.

2. The motor rotor according claim 1, wherein
the resolver rotor is formed of a plurality of steel plates stacked one on another, and
one of the steel plates located at the end face of the resolver rotor abutted by the crimping protrusion is formed with an oval hole at a position corresponding to the crimping protrusion.

3. The motor rotor according claim 2, wherein the crimping protrusion is formed to protrude on the shaft at four locations on sides of a minor axis of the resolver rotor formed substantially in an oval shape.

4. The motor rotor according claim 1, wherein the crimping protrusion is formed to protrude on the shaft at four locations on sides of a minor axis of the resolver rotor formed substantially in an oval shape.

* * * * *